(12) United States Patent
    Vollmer

(10) Patent No.: US 7,915,777 B2
(45) Date of Patent: Mar. 29, 2011

(54) RING COIL MOTOR

(75) Inventor: Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 88 days.

(21) Appl. No.: 12/304,926

(22) PCT Filed: May 4, 2007

(86) PCT No.: PCT/EP2007/054353
    § 371 (c)(1),
    (2), (4) Date: Dec. 15, 2008

(87) PCT Pub. No.: WO2007/144232
    PCT Pub. Date: Dec. 21, 2007

(65) Prior Publication Data
    US 2009/0206686 A1    Aug. 20, 2009

(30) Foreign Application Priority Data
    Jun. 16, 2006   (DE) .......................... 10 2006 027 819

(51) Int. Cl.
    *H02K 17/00*    (2006.01)
(52) U.S. Cl. ........................................ 310/166; 310/168
(58) Field of Classification Search .................. 310/166, 310/168, 181, 208, 269
    See application file for complete search history.

(56) References Cited

U.S. PATENT DOCUMENTS

| 5,218,250 | A | * | 6/1993 | Nakagawa | 310/12.21 |
| 5,719,452 | A | * | 2/1998 | Sugiura | 310/49.19 |
| 5,723,921 | A | * | 3/1998 | Sugiura | 310/49.19 |
| 6,960,858 | B2 | * | 11/2005 | Kawai | 310/181 |
| 2002/0130630 | A1 | | 9/2002 | Uchida | |
| 2002/0180280 | A1 | | 12/2002 | Hsiao | |
| 2005/0023905 | A1 | | 2/2005 | Sakamoto | |
| 2005/0082934 | A1 | * | 4/2005 | Kawai | 310/181 |
| 2005/0242679 | A1 | * | 11/2005 | Walter et al. | 310/181 |
| 2007/0222304 | A1 | * | 9/2007 | Jajtic et al. | 310/12 |

FOREIGN PATENT DOCUMENTS

| DE | 723 7251 U | 12/1974 |
| DE | 103 29 651 A1 | 2/2005 |
| DE | 10 2004 045 992 A1 | 4/2006 |
| DE | 10 2004 054 832 A1 | 6/2006 |
| FR | 2 660 125 A1 | 9/1991 |
| GB | 2 052 175 A | 1/1981 |
| WO | WO 99/05772 A1 | 2/1999 |

* cited by examiner

*Primary Examiner* — Thanh Lam
(74) *Attorney, Agent, or Firm* — Henry M. Feiereisen; Ursula B. Day

(57) ABSTRACT

The invention relates to a ring coil motor (1, 20) with a primary part (3, 21) and a secondary part (2, 22), wherein the primary part (3, 21) has a ring coil (6, 25) and permanent magnets (9, 27).

13 Claims, 3 Drawing Sheets

RING COIL MOTOR

BACKGROUND OF THE INVENTION

The invention relates to a ring coil motor having a primary part and a secondary part.

Electrical machines have a primary part and a secondary part. In particular, the primary part is opposite the secondary part. The primary part is intended for electric current to flow through. The secondary part has, for example, permanent magnets or windings through which a current can flow. In the case of electrical machines such as this, in consequence, both the primary part and the secondary part have active magnetic means for generation of magnetic fields. The magnetic fields which are produced by the primary part and the secondary part interact with one another, and therefore produce a torque.

DE 103 29 651 A1 discloses a linear motor with a ring winding, wherein the primary part is formed from a plurality of laminated cores and the laminated cores are surrounded by circumferential coils, also referred to as ring coils. In order to produce a second magnetic field, the secondary part has, for example, permanent magnets.

The design of an electrical machine such as this is very complex, since both the primary part and the secondary part have to have means for producing magnetic fields.

SUMMARY OF THE INVENTION

The object of the present invention is to provide a simplified electrical machine, in particular a simplified secondary part, thus making it possible to construct the electrical machine in a simpler form, and at less cost.

This object is achieved by a ring coil motor having a primary part and a secondary part, wherein the primary part has a ring coil and permanent magnets.

The electrical machine according to the invention has a primary part and a secondary part, wherein the primary part has a ring coil and permanent magnets.

The primary part is designed such that it has two means for producing a magnetic field. The secondary part has no means for producing a magnetic field.

The primary part has at least one ring coil which is arranged essentially concentrically around the secondary part. Furthermore, the primary part has permanent magnets, which are likewise arranged essentially concentrically around the secondary part. The ring coil and the permanent magnets produce an excitation field which, interacting with the secondary part, produces a torque. Because of the permanent magnets, an additional magnetic flux is coupled to the ring coil. The permanent magnets produce additional permanent magnet fields which have a force-providing or force-transmitting effect on the secondary part. The individual permanent magnets are in the form of integral permanent magnets. However, they may also be produced from a plurality of permanent magnet elements which are joined together to form a permanent magnet.

The use of ring coils which, inter alia, are also referred to as solenoid coils, offers advantages over a conventional winding. One or more ring coils forms or form a circumferential winding which has a considerably reduced end winding length and no current losses such as those which occur in a conventional end winding. This leads to less power being lost, and thus to better efficiency. Furthermore, the axial extent of the ring coil motor is shorter by the reduced end winding length, thus leading to a motor of compact design.

The ring coil is preferably located in a coil holder which surrounds the ring coil and has an opening towards the secondary part. The coil holder, which can also be referred to as a slot, is used for arrangement of the ring coil. Furthermore, the radially magnetized permanent magnets are arranged on the coil holder. The permanent magnets are arranged on that side of the coil holder which is opposite the secondary part.

The permanent magnets are preferably arranged with alternating polarity. The magnetic polarity is chosen such that the permanent magnets have different polarities both in the axial direction and in the circumferential direction.

The permanent magnets are arranged with a number of pole pairs p on the coil holder or slot. Any desired number of pole pairs and thus permanent magnets can be arranged. The number of ring coils is independent of the number of pole pairs p.

It is particularly advantageous for the primary part of the ring coil motor to have three ring coils which are arranged axially one behind the other around the secondary part. Each ring coil is provided for one phase u, v, w of a three-phase power supply system. It is also possible to fit a plurality of ring coils, wherein the number of ring coils is preferably an integer multiple of three, thus making it possible to produce a three-phase motor. The number n of ring coils is therefore given by: n=3i where i=1, 2, 3 etc. Adjacent ring coils are intended for different phases of the three-phase power supply system. If, for example, the primary part has six ring coils, then the three phases of the three-phase power supply system are, for example, arranged in the sequence, u, v, w, u, v, w. If the primary part has more than three ring coils, for example six or nine, then some of the adjacent ring coils could, for example, also be provided for the same phase of the three-phase power supply system. If there are six ring coils, the phases could, for example, be arranged in the sequence u, u, v, v, w, w.

A plurality of ring coils on one phase can be connected in various ways, for example in parallel or in series. For example, the ring coils on one phase or in one winding section can be connected in parallel when the voltages induced in the ring coils in one winding section have the same phase angle.

Intermediate rings, which are composed of a magnetically non-permeable material, are preferably arranged between two coil holders or slots. The intermediate rings are particularly highly suitable for cooling the primary part and, for example, are composed of a thermally conductive encapsulation compound.

The primary part preferably has cooling, for example water cooling. Since the ring coil is completely embedded in the coil holder, cooling can be arranged well on the outer surface of the primary part.

The coil holder is preferably produced from a soft-magnetic material, which is magnetically highly permeable, in particular ferromagnetic, for example iron.

The coil holder is preferably produced from one or more laminated cores in order to avoid hysteresis phenomena and eddy currents. The coil holder may, however, also be produced in a solid form and/or as a so-called powder pressed part (composed of sintered material).

A laminated core of the coil holder comprises a plurality of individual laminates which are arranged or laminated tangentially. The magnetic film which is produced by the primary part can therefore enter the primary part axially, where it is first of all passed radially, is deflected axially, and is then passed in the radial direction again to the secondary part.

There are a number of options for the entire fixing of the coil holders. For example, the coil holders can be secured against rotation by means of pins, and can then be axially clamped by means of tie rods. However, it is also possible to encapsulate the primary part, thus fixing the coil holders with the ring coils.

In particular, the coil holder has pole pitch gaps which further improve the efficiency of the ring coil motor. The width of a pole pitch gap corresponds at least to the width of the air gap between the primary part and the secondary part.

It is particularly advantageous for the secondary part to have a reluctance profile. The reluctance profile is designed, for example, such that the secondary part has teeth on the surface facing the primary part. In this case, the number of teeth corresponds in particular to the number of pole pairs of the permanent magnets. The tooth width in the circumferential direction is preferably the same as the permanent magnet width in the circumferential direction.

The air gap between the primary part and the secondary part is bounded by the permanent magnets of the primary part and by the teeth of the secondary part.

The secondary part is preferably produced from a soft-magnetic material, which is magnetically highly permeable, in particular ferromagnetic, for example iron. Furthermore, the secondary part is produced from laminated cores in order to avoid hysteresis phenomena and eddy currents. However, the secondary part may also be produced in a solid form and/or as a so-called powder pressed part (composed of sintered material). The gaps between the teeth of the secondary part remain free, or are filled with a non-magnetic material, such as plastic.

The ring coil motor may be in the form of a rotating motor or a linear motor, in which case either the primary part or the secondary part is movable.

In the case of a rotating machine, both the rotor and the stator are respectively in the form of a primary part and a secondary part. The stator is advantageously in the form of the primary part, since it makes it easier to supply the electrical power. The rotor is in the form of the secondary part, which leads to a simplified rotor design since it need not have any means for producing a magnetic field. In particular, the rotor does not have any permanent magnets, which has the advantage that this avoids the permanent magnets becoming loose during operation of the motor, particularly at high rotation speeds.

Because of the ring coils, a linear motor is cylindrical, in which case either the primary part or the secondary part is movable. The primary part may have different types of cross section, for example, circular, rectangular or polygonal. By way of example, the secondary part then comprises only an iron reaction rail.

A ring coil motor design such as this has the advantage that the secondary part has no active means for producing a magnetic field. The secondary part has only a means for guiding magnetic fields, and is therefore simple and cost-effective to manufacture. A ring coil motor according to the invention is particularly highly suitable for electric motors with a large number of poles, that is to say motors whose number of pole pairs is p>7 and for combination drives, that is to say drives which have both a linear drive and a rotating drive.

BRIEF DESCRIPTION OF THE DRAWING

Further features and details of the invention will be explained in more detail in the following description in conjunction with the attached drawings and with reference to exemplary embodiments. In this case, features and relationships which are described in individual variants can in principle be transferred to all the exemplary embodiments. In the drawings.

DETAILED DESCRIPTION OF PREFERRED EMBODIMENTS

Figure 1:
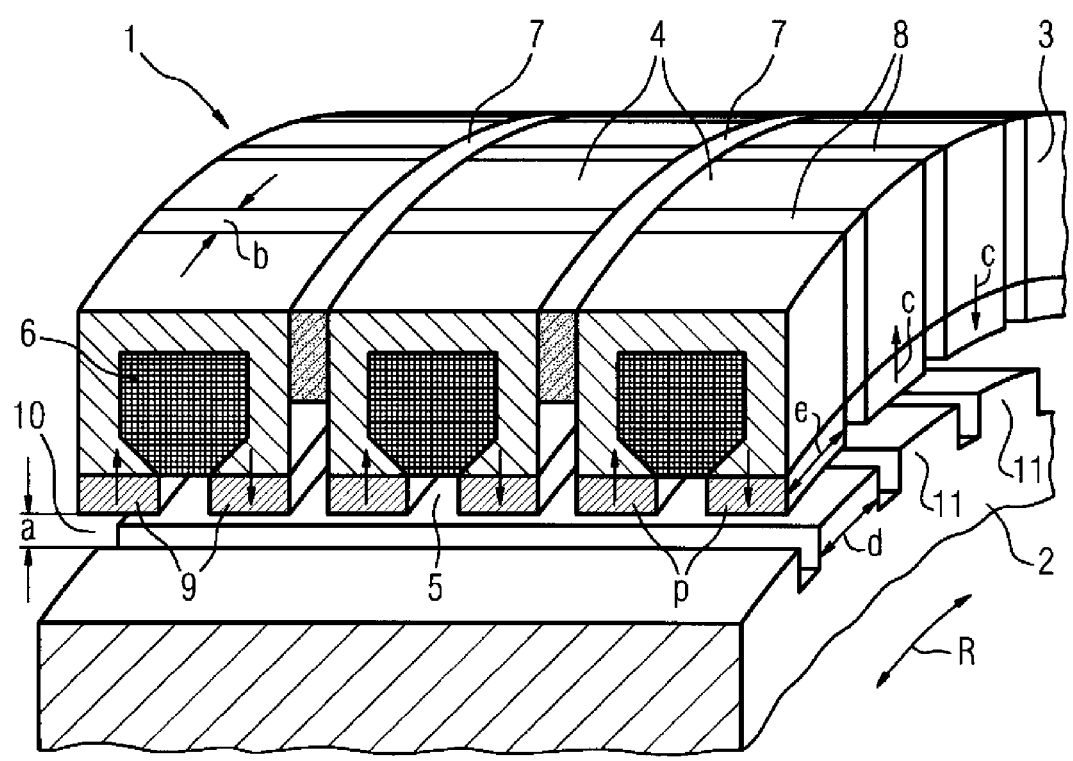
FIG. 1 shows a perspective partial view of a first exemplary embodiment of a ring coil motor according to the invention.

FIG. 1 shows a perspective partial view of the ring coil motor 1 according to the invention in an embodiment as a rotating ring coil motor, whose method of operation corresponds to that of a three-phase synchronous machine with permanent-magnet excitation. The ring coil motor 1 has the rotor 2 (secondary part) and the stator 3 (primary part). The stator 3 has three ring coils 6, which are arranged axially one behind the other around the rotor 2. By way of example, the ring coils 6 are produced from a copper (Cu) winding. Each ring coil 6 is intended for one phase u, v, w of a three-phase power supply system. Each ring coil 6 is located in a coil holder 4, which surrounds the ring coil and has an opening 5 towards the rotor 2. The coil holders 4 are used for arrangement of the ring coils 6. Furthermore, the radially magnetized permanent magnets 9 are arranged on the coil holders 4. The permanent magnets 9 are arranged on that side of the coil holder 4 which is opposite the rotor 2.

The permanent magnets 9 are arranged with alternating polarity. The magnetization direction is indicated by the arrows c. The magnet polarity is chosen such that the permanent magnets 9 have different polarities both in the axial direction and in the circumferential direction.

The permanent magnets 9 are arranged with a number of pole pairs p on the coil holder 4. Any desired number of pole pairs p and thus permanent magnets 9 may be arranged, the number of permanent magnets 9 in the circumferential direction being given by: 2p=2, 4, 6, etc. In particular, the number of permanent magnets is given by: $2p < \Pi \cdot D/6$ mm, where D is the external diameter of the rotor 2. The number of ring coils 6 is independent of the number of pole pairs p.

An intermediate ring 7, which is composed of a magnetically non-permeable material, is arranged between each two coil holders 4. The intermediate rings 7 are particularly highly suitable for cooling the stator 3 and the coil holders 4 and they are composed, for example, of a thermally conductive encapsulation compound.

The coil holders 4 have the pole pitch gaps 8 which further improve the efficiency of the ring coil motor 1. The width b of a pole pitch gap 8 in this case corresponds to the width a of the air gap 10 between the stator 3 and the rotor 2.

The rotor 2 has a reluctance profile. The reluctance profile is designed such that the rotor 2 has the teeth 11 on the surface facing the stator 3. The number of teeth 11 corresponds to the number of pole pairs p of the permanent magnets 9. The tooth width d in the circumferential direction corresponds to the permanent magnet width e in the circumferential direction. The gaps or the spaces between the teeth 11 are not filled, that is to say they remain free. However, they can be filled with a non-magnetic material, for example plastic.

Figure 2:
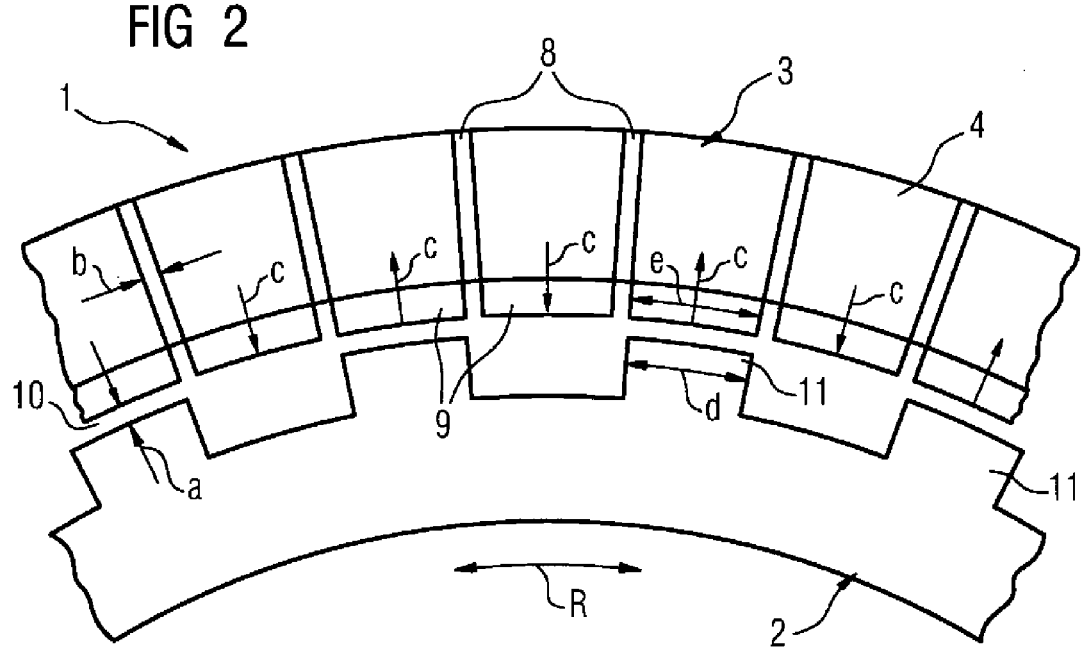
FIG. 2 shows a side view of the first exemplary embodiment shown in FIG. 1.

FIG. 2 shows a side view of the exemplary embodiment shown in FIG. 1. In particular, FIG. 2 shows a detail of a cross-sectional illustration at right angles to a rotor shaft, which is not shown. The rotor 2 has the teeth 11, with the tooth width d corresponding to the width e of the permanent magnets 9. The magnetization direction of the individual permanent magnets is indicated by the arrows c. The FIG. also shows that the coil holder 4 has the pole pitch gaps 8, with the width b of a pole pitch gap 8 corresponding to the width a of the air gap 10 between the rotor 2 and the stator 3.

Figure 3:
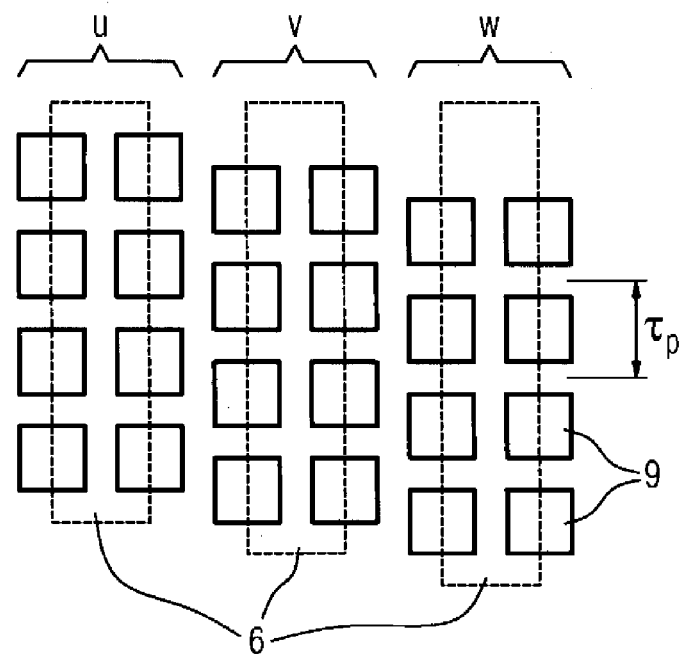
FIG. 3 shows a further view of the first exemplary embodiment shown in FIG. 1.

FIG. 3 shows a further view of the exemplary embodiment shown in FIG. 1. In particular, FIG. 3 shows the arrangement of the permanent magnets 9 on the stator 3. The ring coils 6 are each connected to one phase u, v, w of a three-phase power supply system. FIG. 3 shows particularly well that the pole pairs p of the phases u, v, w are each shifted in the circumferential direction through $\frac{2}{3}*\tau_p$ or 120° of a pole pitch $\tau_p$. This arrangement of the pole pairs p further improves the efficiency of the ring coil motor 1.

Figure 4:
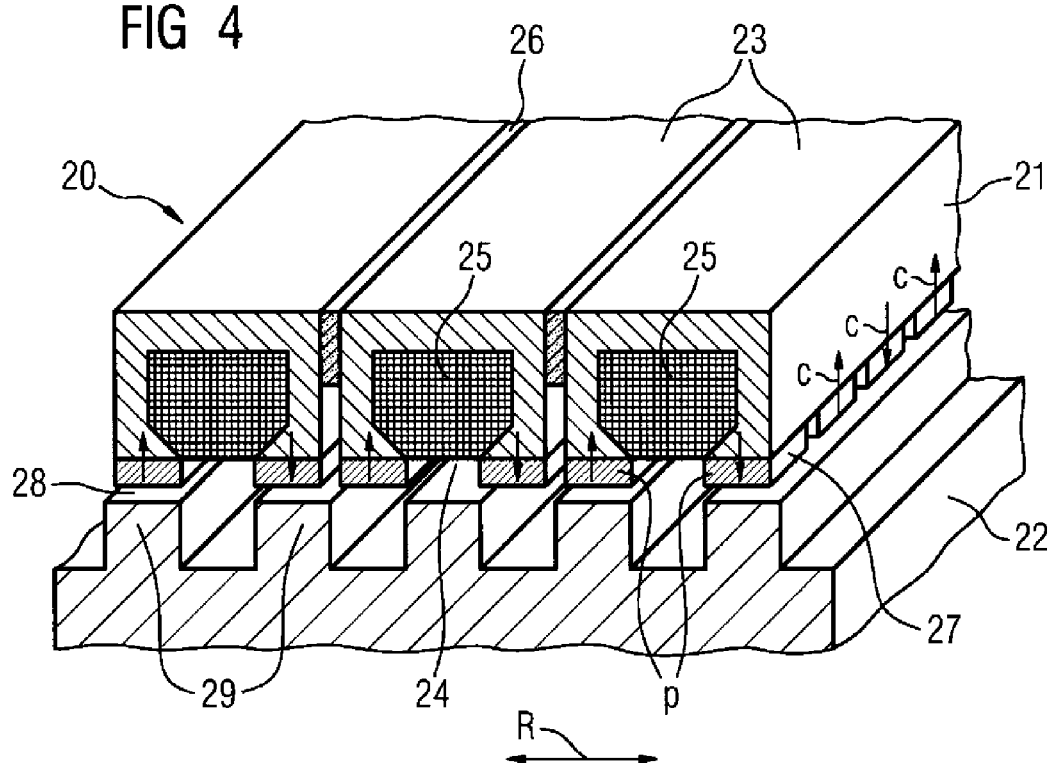
FIG. 4 shows a perspective partial view of a second exemplary embodiment of a ring coil motor according to the invention.

FIG. 4 shows a perspective partial view of a second exemplary embodiment of a ring coil motor 20 according to the invention, in an embodiment as a linear motor whose method of operation corresponds to that of a three-phase synchronous machine with permanent-magnet excitation. The ring coil motor 20 has the primary part 21 and the secondary part 22.

The ring coil linear motor 20 is cylindrical because of the ring coils 25, with the secondary part 22 being the moving part. The primary part 21 may have different types of cross section, for example, circular, rectangular or polygonal. The secondary part 22 is in the form of an iron reaction rail with the teeth 29.

The primary part has three ring coils 25, with each ring coil 25 being intended for one phase u, v, w of a three-phase power supply system. Further ring coils 25 may, of course, be arranged, with the number preferably being a multiple of three. Each ring coil 25 is located in a coil holder 23 which surrounds the ring coil and has an opening 24 towards the secondary part. Furthermore, the radially magnetized permanent magnets 27 are arranged on the coil holders 23. The permanent magnets 27 are arranged with alternating polarity. The magnetization direction is indicated by the arrows c. The magnetic polarity is chosen such that the permanent magnets 9 have different polarities both in the axial direction, that is to say in the movement direction R of the secondary part 22, and in the circumferential direction.

An intermediate ring 26 which is composed of a magnetically non-permeable material is arranged between each two coil holders 23. The intermediate rings 26 are particularly highly suitable for cooling the primary part 21 and the coil holders 23, and, for example, are composed of a thermally conductive encapsulation compound.

Figure 5:
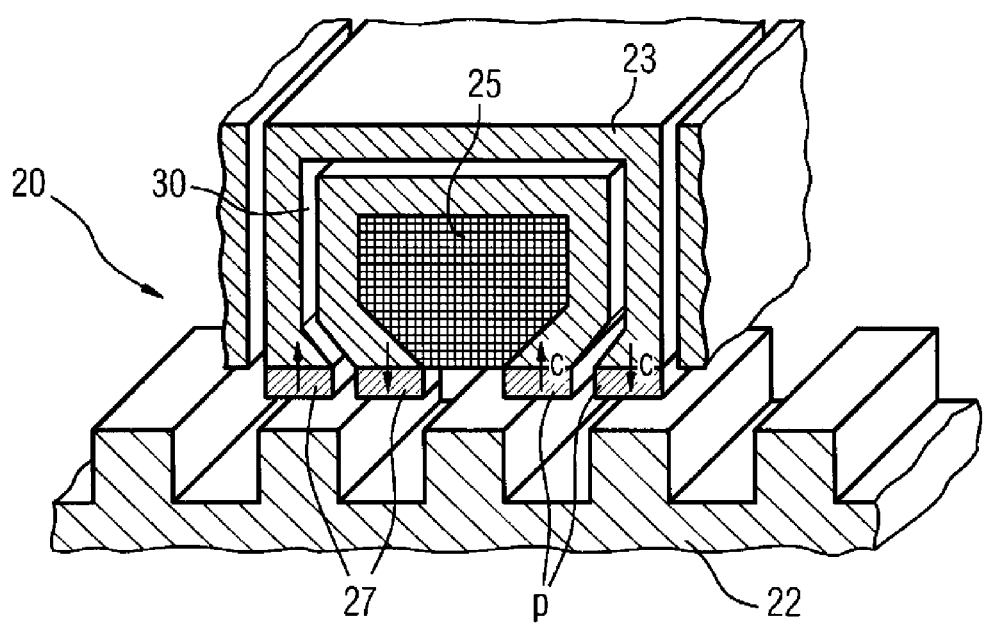
FIG. 5 shows a perspective partial view of a further refinement of the second exemplary embodiment shown in FIG. 4.

FIG. 5 shows a perspective partial view of a further refinement of the second exemplary embodiment. FIG. 5 shows that a ring coil 25 has two pole pairs p in the axial direction, with only one pole pair p for each ring coil 25 being shown in FIG. 4. An arrangement such as this of a plurality of pole pairs p on a ring coil 25 or a coil holder 23 in the axial direction is advantageous because this results in more magnetic flux being coupled to the respective ring coil 25. It is likewise possible to also arrange further pole pairs p for each ring coil in the axial direction. The permanent magnets 27 of a pole pair p have different magnetization directions, as is indicated by the arrows c. Ideally, the permanent magnets 27 of a pole pair p are separated from one another by a magnetic flux barrier 30.

What is claimed is:

1. A ring coil motor, comprising:
   a primary part; and
   a secondary part separated from the primary part by an air gap,
   said primary part having a coil holder, a ring coil held in the coil holder, and permanent magnets radially magnetized and arranged on the coil holder adjacent to the air gap, wherein adjacent permanent magnets have different polarities, and
   wherein the coil holder has pole pitch gaps, each pole pitch gap having a width in correspondence to a width of the air gap.

2. The ring coil motor of claim 1, wherein the primary part has three ring coils.

3. The ring coil motor of claim 1, wherein the primary part has an integer multiple of three ring coils.

4. The ring coil motor of claim 1, wherein the primary part has an intermediate ring arranged between two of said coil holder.

5. The ring coil motor of claim 4, wherein the intermediate ring is made of magnetically non-permeable material.

6. The ring coil motor of claim 1, wherein the primary part is provided with a cooling system across an outer surface of the primary part.

7. The ring coil motor of claim 1, wherein the secondary part has a reluctance profile.

8. The ring coil motor of claim 1, wherein the coil holder and the secondary part are made of soft-magnetic and magnetically highly permeable material.

9. The ring coil motor of claim 1, wherein pole pairs of ring coils are arranged in offset relationship in a circumferential direction by $\frac{2}{3}*\tau_p$, wherein $\tau_p$ is a pole pitch in the circumferential direction.

10. The ring coil motor of claim 1, constructed in the form of a rotating motor.

11. The ring coil motor of claim 1, constructed in the form of a linear motor.

12. The ring coil motor of claim 1, wherein the secondary part is a rotor, said permanent magnets being provided at a number 2p as governed by the relationship $2p<\Pi*D/6$ mm, wherein p is the number of pole pairs and D is an external diameter of the rotor.

13. The ring coil motor of claim 1, further comprising a magnet flux barrier for separating the permanent magnets of a pole pair.

* * * * *